Sept. 18, 1923.
F. E. STEVENSON
1,468,523
HYDRAULIC PRESS
Original Filed March 10, 1922   2 Sheets-Sheet 1
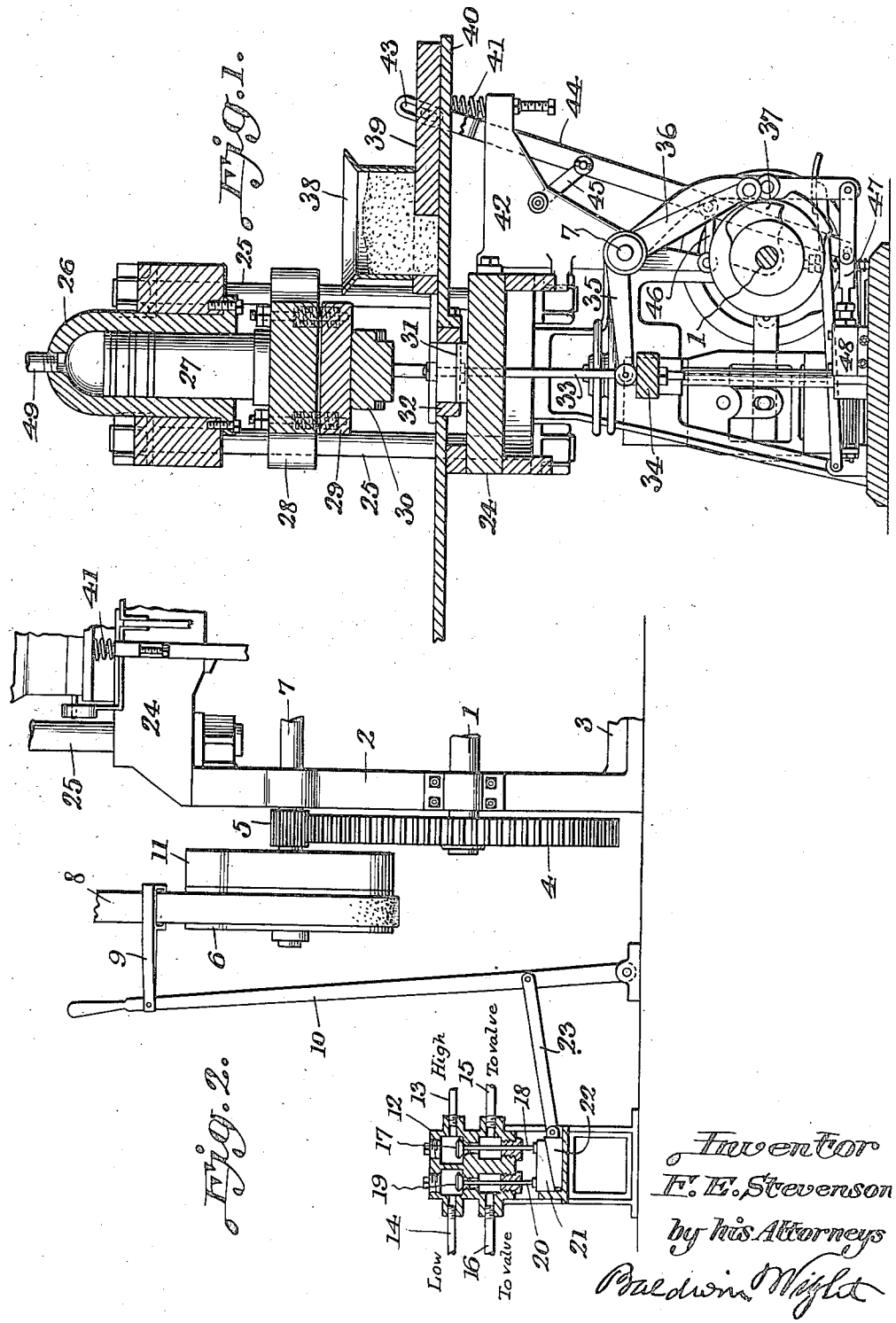
Inventor
F. E. Stevenson
by his Attorneys
Baldwin Wight

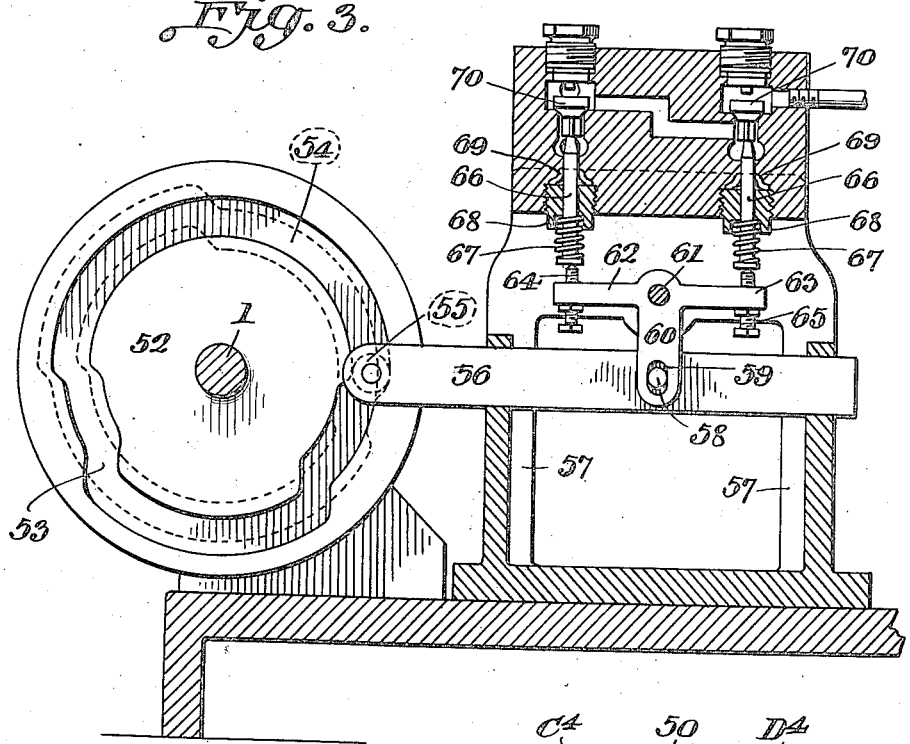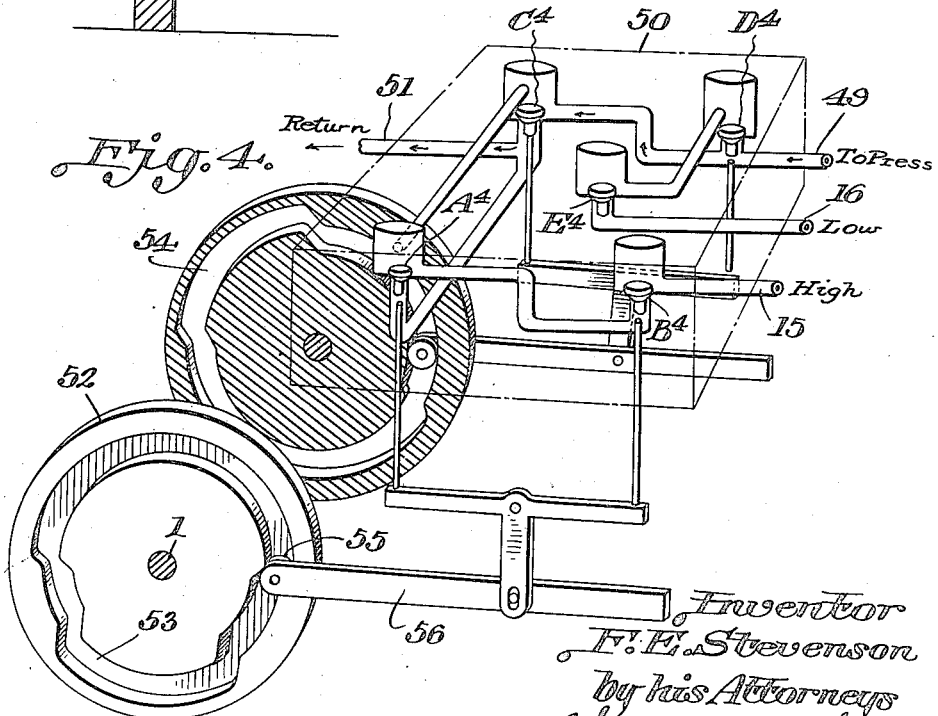

Patented Sept. 18, 1923.

1,468,523

UNITED STATES PATENT OFFICE.

FRANCIS E. STEVENSON, OF MOUNT GILEAD, OHIO, ASSIGNOR TO THE HYDRAULIC PRESS MANUFACTURING COMPANY, OF MOUNT GILEAD, OHIO.

HYDRAULIC PRESS.

Original application filed March 10, 1922, Serial No. 542,623. Divided and this application filed June 22, 1922. Serial No. 570,110.

*To all whom it may concern:*

Be it known that I, FRANCIS E. STEVENSON, a citizen of the United States, and resident of Mount Gilead, in the county of Morrow and State of Ohio, have invented certain new and useful Improvements in Hydraulic Presses, of which the following is a specification.

My invention relates to operating means for hydraulic presses, particularly for tile presses such as described in my application Serial No. 542,623, filed March 10, 1922, of which this application is a division.

An object of my invention is the provision of a valve operating mechanism for a hydraulic press, particularly one adapted for the use of low and high pressure.

Another object of the invention is to provide in a press wherein certain instrumentalities are operated mechanically and other instrumentalities are operated by hydraulic pressure, means whereby the power means may be cut off and the hydraulic means simultaneously cut off from the source or sources of pressure.

Other objects will be apparent from the following detailed description and the appended claims.

In the drawings:

Figure 1 is a vertical section through the press showing the general relation of the various parts thereof.

Figure 2 is a fragmentary view, partly in section, of the mechanism for disconnecting the power means and cutting off the hydraulic means from the sources of pressure.

Figure 3 is a sectional view through a pair of valves and the operating means therefor.

Figure 4 is a diagrammatic view showing the relation of the valves in the valve box to the operating means, and also showing the various passages controlled by said valves.

A main driving shaft 1 is mounted in standards rising from the base 3 of the press, one of said standards being shown at 2. Said shaft has a pinion 4 keyed or otherwise fastened thereto which meshes with a pinion 5 connected to a pulley 6, both the pinion 5 and the pulley 6 rotating freely on a shaft 7 mounted in the standards. Power is transmitted to the pulley 6 from any suitable source by a belt 8 which is connected by a link 9 to a belt shift lever 10 by means of which the belt may be moved in the usual manner to throw it from the pulley 6 to an idler pulley 11 whenever it is desired to stop the operation of the press.

Communicating with a valve box 12 is a pipe 13 connected to a source of high pressure and a pipe 14 connected to a source of low pressure. Pipes 15 and 16 lead from the valve box to operating valves hereinafter described. The passage in the valve box 12 which affords communication between the pipes 13 and 15 is controlled by a valve 17 having a stem 18, while the passage which affords communication between the pipes 14 and 16 is controlled by a valve 19 having a stem 20. These stems rest on or are fastened to a wedge member 21 underlying which is a cooperating wedge member 22 connected by a link 23 to the belt shifting lever 10.

In the position shown in Figure 2 the belt 8 is on the driving pulley 6 and the valves 17 and 19 are open. Should it be desired to stop the operation of the press, the lever 10 is operated throwing the belt 8 on to the idler pulley 11 and at the same time sliding the wedge 22 out so that the wedge 21 can drop, together with the valve stems 18 and 20, thus causing the valves 17 and 19 to close their passages and cut off hydraulic pressure from the press. All parts of the press may be simultaneously stopped in this manner. When desired to start the press a reverse movement of the lever 10 will again cause power to be transmitted to the driving shaft 1 and open the valves 17 and 19.

A portion of the base 24 of the press proper is shown in Figures 1 and 2 and this is connected by strain rods 25 to the cylinder 26 in which slides a press ram 27 connected to a platen 28 to the lower side of which is connected a sub-platen 29. Rigidly connected to the sub-platen is the upper die 30 which cooperates with a lower die 31 rigidly connected to the base 24. Fitting around the lower die is a mold plate 32.

This mold plate is connected by rods 33 to a cross bar 34 which is moved downwardly by arms 35 of bell crank levers loosely turning on the shaft 7, the other arms 36 extending downwardly and having rollers operated by cams 37 mounted on the shaft 1. The mold plate is returned by springs not herein shown.

A hopper 38 is supported above a charging box 39 which slides on a table 40. This table 40 has an up and down movement with the mold 32 and is counterbalanced by springs 41 bearing against brackets 42 connected to the base 24. The charging box 39 is given a reciprocating motion by means of a lever 44 connected therewith by pin and slot connections 43. This lever is connected to the brackets 42 by links 45 and 46, forming a floating support for said lever. At its lower end the lever 44 is connected to a piston 47 of hydraulic mechanism generally indicated at 48. Hydraulic pressure is communicated to the cylinder 26 through a pipe 49 as shown in Figure 1, this pipe communicating with the valve box indicated in Figure 4.

The structure and operation of the press proper is not illustrated nor described in detail herein, since it is fully shown in the parent application and forms no part of the invention claimed in this case. It is merely desired to show that the up and down movement of the mold plate is mechanically operated, while the to and fro movement of the charging box and the movement of the ram 27 are controlled by hydraulic pressure.

Suitably located in the base of the machine is a valve box 50, indicated in outline in Figure 4, with which communicate the pipes 15, 16, 49 and a pipe 51 leading back to the source of pressure and acting as a return or exhaust pipe. In this box are disposed valves A⁴, B⁴, C⁴, D⁴, and E⁴ controlled to admit pressure to the ram 27 from high or low pressure sources as desired and as explained in detail in the parent application.

These valves are controlled as follows. Upon the shaft 1 is mounted a wheel 52 having cam grooves 53 and 54 in opposite faces. In Figure 4 this wheel is shown as split into two parts for clearness, while in Figure 3 one cam groove 53 is shown in full lines and the one on the opposite face of the wheel 52 is shown in dotted lines. Each cam groove controls a pair of valves, and as the operating means is identical for each pair, it will be described for one pair only and with reference particularly to Figure 3.

In the groove 53 operates a roller 55 on the end of a sliding arm 56 supported in members 57. A pin 58 on this slide engages in an elongated slot 59 in the vertical arm of a T-shaped lever 60 pivoted at 61 and having arms 62 and 63 carrying screws 64 and 65 respectively which may be adjusted and held as desired by lock nuts as clearly shown in the drawings.

These pins 64 and 65 underlie identical valve stems 66 surrounded by springs 67 which lie between the heads of the stems and the valve glands 68. Suitable flange packing 69 is provided and the valves 70 are check valves of a common and well known type.

It is obvious that rotation of the wheel 52 will cause a sliding movement of the arm 56, which will rock the T-shaped lever 60 about its pivot 61 and open one or the other of the pair of valves. The cam grooves 53 and 54 will be designed to operate the valves in proper sequence as desired.

The operation of the parts will be evident from the above description. Various detailed changes in form, proportions, and arrangement may be made without departing from the spirit of the invention, and the devices shown may be used with various types of hydraulic presses. In general the invention is to be regarded as limited only by the scope of the appended claims.

I claim as my invention:

1. A press comprising a mold, a charging device, power means for operating the mold and charging device, a platen, hydraulic means for operating the platen, and means for simultaneously disconnecting the power means and cutting off the hydraulic means from the source of pressure regardless of the position of the operating parts of the press.

2. A press comprising power means for operating elements thereof, hydraulic means for operating other elements, said hydraulic means receiving power from sources of high and low pressure, and means for simultaneously disconnecting the power means and cutting off the hydraulic means from both sources of pressure regardless of the position of the operating parts of the press.

3. A press comprising power means for operating elements thereof, hydraulic means for operating other elements, said hydraulic means receiving power from sources of high and low pressure, a valve box, valves therein controlling the supply of power from both sources to the hydraulic means, and means for simultaneously disconnecting the power means, and closing said valves.

4. In a press, a valve mechanism comprising two check valves, separate stems underlying each valve, a three armed lever, an arm of the lever underlying each stem, a sliding arm connected to the third lever arm, and cam means for sliding this arm, thereby rocking the lever and operating the valves as desired.

5. In a press, a valve mechanism comprising two check valves, separate stems disconnected therefrom but underlying the same, springs for normally urging the stems downward, a three armed lever having an arm underlying each stem, a sliding arm connected to the third lever arm, and cam means for sliding this arm, thereby rocking the lever and operating the valves as desired.

6. In a press, a valve mechanism comprising two check valves, separate stems disconnected therefrom but underlying the same, springs for normally urging said stems downward, a three armed lever having an arm underlying each stem, a sliding arm connected to the third lever arm, a power shaft, and cam means rotating with the power shaft to operate the sliding arm, thereby rocking the lever and operating the valves as desired.

7. In a press, a valve mechanism comprising a plurality of valves, stems disconnected therefrom but adjacent the same, a three-armed lever of which two arms lie adjacent the valve stems, a sliding means engaging the third arm of the lever to operate the same, and cam means for controlling the sliding movement of said means.

8. In a press, a valve mechanism comprising a plurality of valves, stems disconnected therefrom but adjacent the same, a three-armed lever of which two arms lie adjacent the valve stems, a sliding member having a pin and slot connection with the third arm of the lever, and cam means for operating said sliding member.

9. In a press, a valve mechanism comprising a plurality of valves, stems disconnected therefrom but adjacent the same, a three-armed lever of which two arms lie adjacent the valve stems, adjustable means in said arms to engage the stems, and cam-operated means for moving the levers to operate the valves in the desired sequence.

10. In a press, a valve mechanism comprising a plurality of valves, stems disconnected therefrom but adjacent the same, springs for holding the stems in inoperative position, levers having arms arranged to operate said stems, and cam-operated means for moving said levers as desired to operate the valves in the desired sequence.

In testimony whereof, I have hereunto subscribed my name.

FRANCIS E. STEVENSON.